Dec. 17, 1935.  O. B. TROEBER ET AL  2,024,259

STEAM COOKER AND FOOD WARMING DEVICE

Filed Sept. 15, 1933  6 Sheets-Sheet 1

Inventors
OTTO B. TROEBER
WILLIAM S. HALSTEAD

By John B. Brady
Attorney

Dec. 17, 1935.   O. B. TROEBER ET AL   2,024,259
STEAM COOKER AND FOOD WARMING DEVICE
Filed Sept. 15, 1933   6 Sheets-Sheet 6

Inventors
OTTO B. TROEBER
WILLIAM S. HALSTEAD
By John B. Brady
Attorney

Patented Dec. 17, 1935

2,024,259

UNITED STATES PATENT OFFICE 2,024,259

STEAM COOKER AND FOOD WARMING DEVICE

Otto B. Troeber, Greenwich, Conn., and William S. Halstead, White Plains, N. Y.

Application September 15, 1933, Serial No. 689,650

19 Claims. (Cl. 53—2)

Our invention relates broadly to kitchen utensils and more particularly to devices for warming or cooking food in which steam is employed as the heating means.

One of the objects of our invention is to provide a portable steam tray adaptable to various forms of commonly used domestic steam generating vessels by which a plurality of individual food receptacles, disposed in the top of the steam tray may be warmed without danger of burning or drying the food placed therein.

Another object of our invention is to provide a food warming device of a type which may be easily and quickly removed from the steam generating vessel and carried as a serving tray to any desired location without disturbing the contents of the food receptacles disposed in the top of the tray.

Still another object of our invention is to provide a portable steam food warming device which may be easily and quickly attached to the top of an ordinary kitchen kettle or pot and whose operation thereafter will, with perfect safety, maintain the warmth of individual quantities of food for long periods of time without attention.

A further object of our invention is to provide a steam food warming device which may be readily attached to a steam generating vessel placed on a range in such manner that the portion of the range unoccupied by the steam generator is kept free for other cooking purposes.

A still further object of our invention is to provide a steam cooker whose operation is effected by the heating of a relatively small quantity of water until steam is generated, utilizing the heat of the steam to warm a series of food receptacles, and then directing the condensed steam in the form of water, back into the steam generating vessel to be converted into steam.

Another object of our invention is to provide a construction of steam cooker that is simple, attractive, relatively light in weight and capable of manufacture inexpensively on a quantity production basis.

Still another object of our invention is to provide a construction of portable steam chest for use on cook stoves and in which one end of the steam chest is provided with an angularly foldable and extensible supporting member, while the other end of the steam chest is provided with a steam inlet and discharge for condensate.

A further object of our invention is to provide a construction of steam chest having a steam inlet and condensate discharge aperture connectible to a steam generator located at one end thereof and a U-shaped supporting device located at the opposite end thereof and foldable from a position substantially normal to the plane of the bottom of the steam chest to a position directly against the steam chest and serving as a support for the steam chest when in extended position and operating in coaction with the discharge aperture to serve as a support for the steam chest when used as a tray when removed from the steam generator.

Additional objects, capabilities and advantages will appear as the description of the invention progresses, and by reference to the accompanying drawings, in which:

Figures 1, 2, 5:
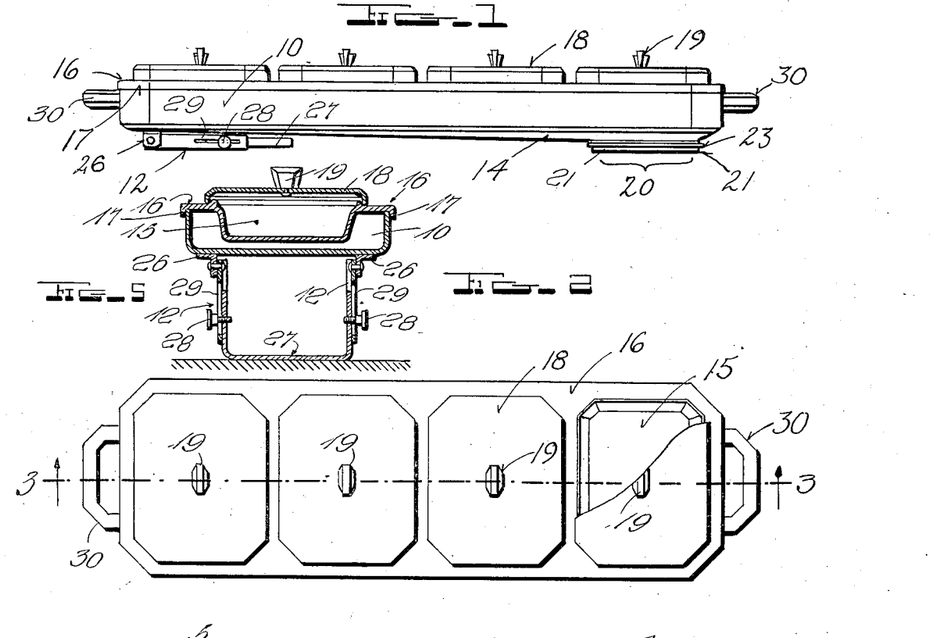
Figure 1 is a front elevation of a steam food warming device constructed in accordance with our invention.
Fig. 2 is a top plan view thereof with parts broken away.
Fig. 5 is a transverse vertical section taken on line 5—5 of Fig. 3.
Figure 3:
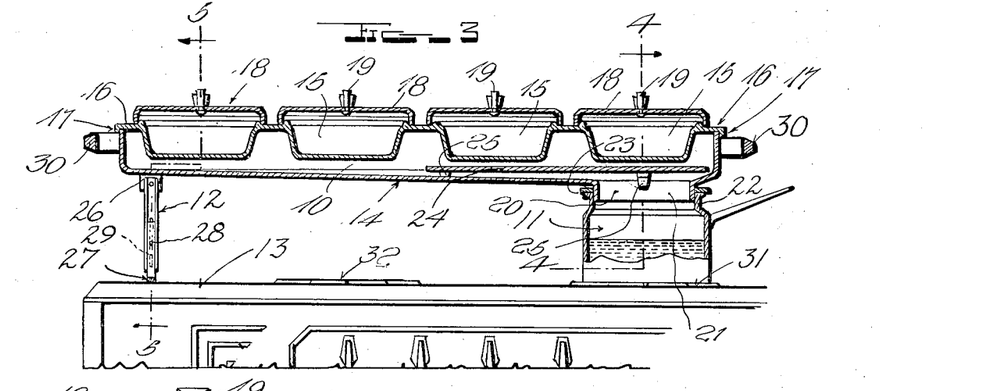
Fig. 3 is a central vertical longitudinal section taken on line 3—3 of Fig. 2.
Figure 4:
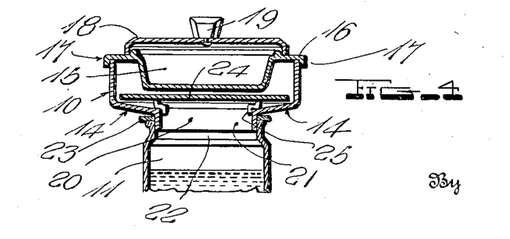
Fig. 4 is a transverse vertical section taken on line 4—4 of Fig. 3.

Referring to the drawings in detail, it will be observed that each form of the invention illustrated in Figs. 1 to 22, inclusive, embodies means for attaching a steam tray in the form of a chest or tank 10 to a steam generating vessel 11, as shown in Fig. 3, means such as provided by extension leg 12 for supporting the device in a level position with respect to the top surface of a range 13, Fig. 3, or other horizontal supporting surface on which the steam generating vessel may be placed, means for returning the condensed steam to the steam generator 11 as provided by the downwardly sloping bottom 14, and means, such as individual food receptacles 15, shown in Figs. 2 and 3, for holding quantities of food in a plurality of separate vessels or recesses disposed in a horizontal position in the top 16 of the device. Heretofore in the art, steam devices of this class used for domestic service for the cooking of food have, in general, taken the form of a cylindrical enclosure within which are vertically disposed several pots for holding food. This form of construction has numerous disadvantages among which are the objectionable cross-flavoring of foods caused by the location of the several food receptacles within the same enclosure, difficulty in inspecting or serving food from the receptacles while the device is in operation, and the relatively high cost of manufacture because of the complicated structure involved. In addition, before food can be served from such a device, it must be transferred to other vessels before it can be served in the dining room.

In the device of our invention, these objections are overcome by the employment of a steam chest provided with a plurality of food receptacles disposed in the same horizontal plane in the top of the steam chest thereby permitting the several food receptacles to be located so that cross flavoring or food by mingling of odors from food within the various receptacles cannot occur. The contents of any food receptacle may be readily inspected or removed while the device is in operation without interfering with the remainder of the receptacles. The construction of the device is such that it may be fabricated by relatively few metallic stamping or casting operations, and the design of the device is such that it may be easily lifted from the steam generator and employed as a serving tray in the dining room, thereby further increasing its usefulness and value in keeping food warm until it is actually served to the consumer.

In the form of the device shown in Figs. 1 to 10, inclusive, the steam chest or tank 10 is enclosed at the top by a flat cover 16 preferably provided with a downwardly projecting peripheral flange 17 extending around its edge thereby effecting a steam tight closure when it is affixed to the body of the steam chest. Food receptacles 15 in the form of recesses which may be pressed in the same piece of metal employed for the cover 16, or made in the shape of separate pans fastened in openings provided in the cover are disposed in horizontal alignment as shown clearly in Figs. 2 and 3. Since the receptacles are an inherent part of the cover 16 in the particular form of construction shown in Figs. 1–3, there exists no possibility of the escape of steam from the interior of the chest 10, through faulty fitting or displacement of the receptacles in the cover. The cover 16, with its fixed food receptacles 15 may be readily lifted from the body of the steam chest and the interior cleaned or dried with a minimum of effort. Cleaning of the food receptacles is thus simplified, since the cover to which they are fastened may readily be held under a faucet or immersed in a dishpan of ordinary size and then washed as a unit. Lids or covers 18, for the various food receptacles are provided with handles 19. The body of the steam chest 10, which may be formed from an aluminum casting as a single unit or fabricated from sheet metal in a pressing operation, is provided with a downwardly inclined bottom 14 whose shape is such that all lines of flow are directed towards the center of the circular steam inlet opening 20 from which projects a downwardly extending collar 21 whose function is to connect the steam chest with the top of a steam generating vessel 11 placed beneath it. A horizontally disposed ring or annular flange 23 may be provided around the upper periphery of the collar to limit the extent of its insertion into the neck 22 of the steam generating vessel 11 and to prevent the escape of steam from the connection thereby formed between the steam chest and the steam generator. The ring also renders the device adaptable to steam generating vessels whose necks are of slightly different sizes.

Figure 6:
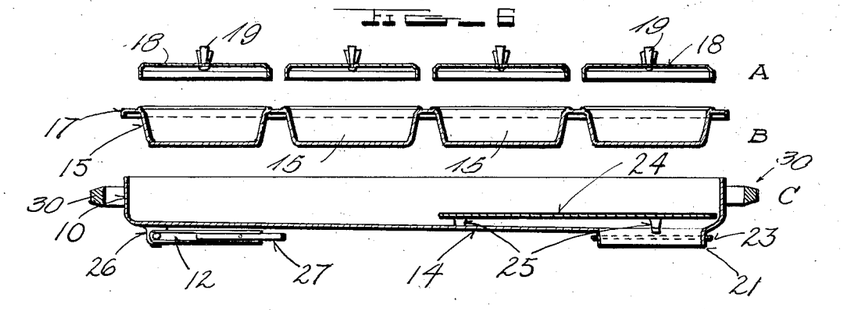
Fig. 6 is a central vertical longitudinal section showing the component parts constituting the food warming device, arranged in juxtaposition.
Figure 7:
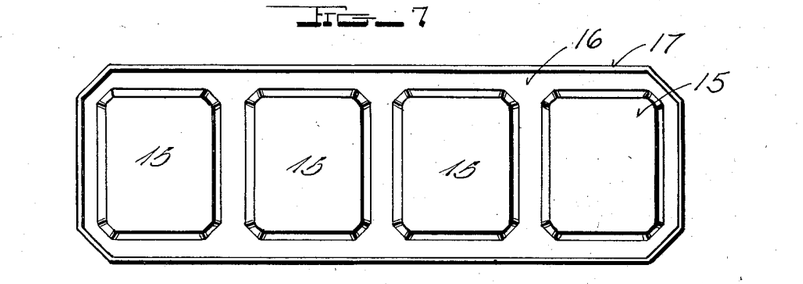
Fig. 7 is a bottom plan view illustrating the inner surface of the removable top of the device showing the bottom portion of the food receptacles.
Figure 8:
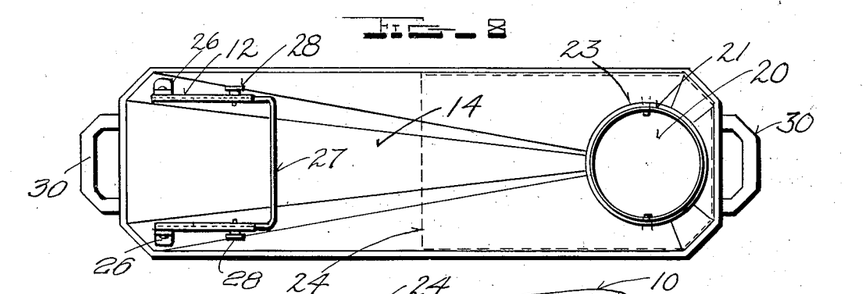
Fig. 8 is a bottom plan view of the device with the supporting legs folded inwardly.
Figures 9, 10:
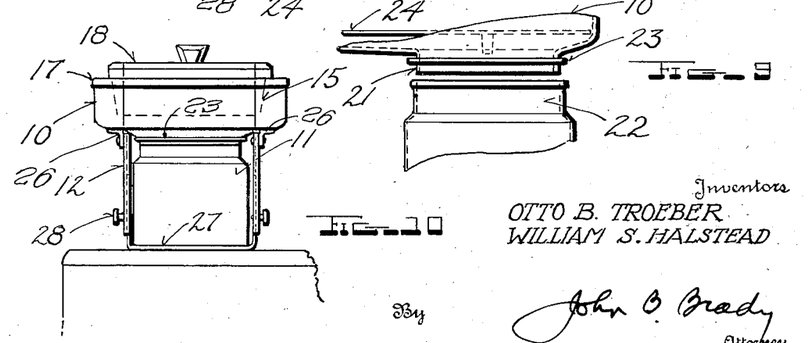
Fig. 9 is a fragmentary side elevation of the downwardly projecting collar and the coacting neck of the steam generating vessel, these parts being shown in juxtaposition.
Fig. 10 is an end view of the device.
Figure 11:
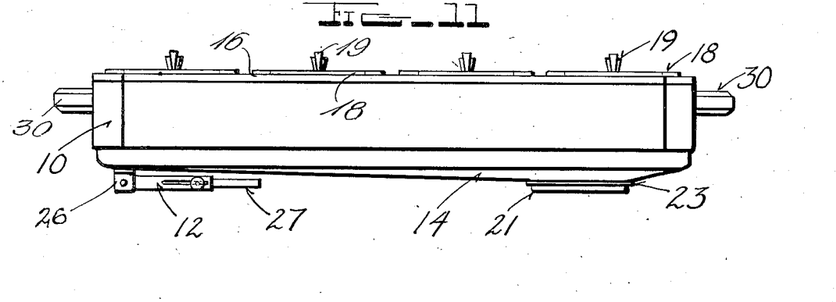
Fig. 11 is a side elevation of a slightly modified form of the device.

In order to effect uniform heating of the various food receptacles in the form of the device shown in Figs. 1 to 22, inclusive, a steam deflector or baffle plate 24 may be inserted within the steam chest in the position shown, for example, in Fig. 6, by the dotted lines in Fig. 8 and in the drawing of Fig. 9. Fig. 6 has been extended to clearly show the component parts of the device of our invention in cross-sectional view at A, B, and C. The component parts A show the general form of construction of the food receptacle covers. The component part B shows the construction of the detachable top of the device embodying the food receptacles and part C illustrates the construction of the body of the device which may be moved as a tray away from the steam generator. The steam inlet or condensate discharge collar or sleeve 21 projects below the bottom of part C for a distance which is substantially equal to the downward vertical projection of the folded U-shaped supporting member 27 and pivotally mounted legs or links 12, thereby providing horizontal disposition of the top of component part C when part C is removed from the steam generator.

The deflector 24, in the form illustrated in Fig. 6 and Fig. 8 consists of a rectangular piece of sheet metal or other thin flat material supported by small legs 25 a short distance above the steam inlet opening 20 in the bottom of the chest. The deflector serves to direct the steam towards the center of the chest before it is permitted to reach the food receptacles and thereby lessens the tendency of the steam to rise directly upwards and accumulate in the portion of the steam chest directly over the steam generator. Hinged supporting leg or link 12 is affixed adjacent the opposite end of the steam chest by means of brackets 26, rigidly fastened to the bottom of the chest, or forming a part of the bottom in the event that a cast tank is employed. The leg is made adjustable in height by means of an extension arrangement illustrated in Figs. 1, 3, 5, 8, and 10, in which are shown the sliding substantially U-shaped extension leg 27 which may be moved in or out of the hinged part of the leg 12. A thumb screw 28 is used to lock the two portions of the leg in the selected position. A slot 29, Fig. 1, provided in the upper or hinged part of the leg 12 permits uninterrupted longitudinal movement of the thumb screw within the length of the slot. Handles 30 are provided at each end of the body of the steam chest so that, with its contents, it may be conveniently attached to or removed from the steam generating vessel and carried to any desired location. The method of operation of the device is clearly shown in Figs. 3 and 10, showing respectively, front and end views of the steam chest in use on a kitchen range.

The steam generator 11 is a pot or kettle partly filled with water, as shown in Fig. 3. The steam generator 11 is placed on a rear burner 31 of range 13. The steam tray is then lifted into position by means of handles 30, the collar 21 is lowered into neck 22 of the pot 11 until the annular flange or ring 23 rests on the top edge of the pot 11. Leg 12 is swung down into a vertical position as shown in Fig. 3, and the height of the leg adjusted by loosening thumb screw 28 and sliding extension leg member 27 up or down until the top of the chest is level with respect to the top of the stove. Once the proper length of the leg has been determined for the height of the particular pot employed, the thumb screw 28 is tightened and further adjustments of the leg are thereafter unnecessary, so long as the same pot is used. It will be apparent on examining the drawings previously described that steam generated in pot 11 will rise through collar 21 into the body of the steam chest 10. As the steam fills the entire space within the chest, the food receptacles are brought to a uniform temperature without danger of burning or drying the food as the limited maximum temperature of the steam automatically limits the degree of heat that the food within the receptacles may attain. The steam deflector or baffle plate 24 distributes the steam and prevents undesirable pocketing of the rising steam in the space directly above the steam generator 11. The condensed steam, in the form of water, flows down the sides of the interior of the chest and follows the sloping bottom 14 to the circular opening 20, thus naturally flowing back into pot 11 to be again converted into steam. In this manner, a comparatively small quantity of water may be employed to provide an automatically regulated heat source for warming food for many hours without attention. Since the quantity of water that is raised to the boiling point in the process is extremely small, a low burner flame or other reduced heat supply means is adequate for operation of the device. When the contents of the food receptacles are to be served, the steam chest is easily lifted from the pot, the leg is swung into a horizontal position and the device may then be used as a serving tray and placed in a level position on a table or other supporting surface in the kitchen or dining room. The steam inlet and condensate discharge collar 21 surrounding circular opening 20 normally engages the upper end of the steam generator. The collar, or cylindrical aperture, 21 is substantially in the form of a sleeve which depends downwardly from the bottom of the steam chest 14 for a distance substantially equal to the downward vertical projection of lugs 26 and the legs or links 12 when folded against the bottom of the steam chest, as shown in Fig. 1. This permits the tray to be readily supported on any horizontal surface in a level position with the lower peripheral edge of the inlet and discharge aperture 21 serving as one supporting portion at one end of the tray and the folded legs or links 12 and U-shaped sliding extension leg member 27 serving as a supporting means adjacent the other end of the tray. The two supporting means, that is, 21 and 12, 27, so space the bottom of the steam chest 14 from the supporting surface of a table that no injury thereto will result.

The heat retained by the metal structure will maintain the warmth of the food for a considerable length of time after it has been removed from the range, thereby extending the warming process until the food is actually served. In Fig. 3 is will be observed that but one burner 31 is occupied by the device. Burner 32 adjacent to burner 31 at the rear of the range is completely spanned by the body of the steam chest, leaving burner 32 free for heating kitchen utensils of moderate height, such as small pans and frying pans. The remainder of the burners of the range are thus unaffected by the operation of the device.

Figure 12:
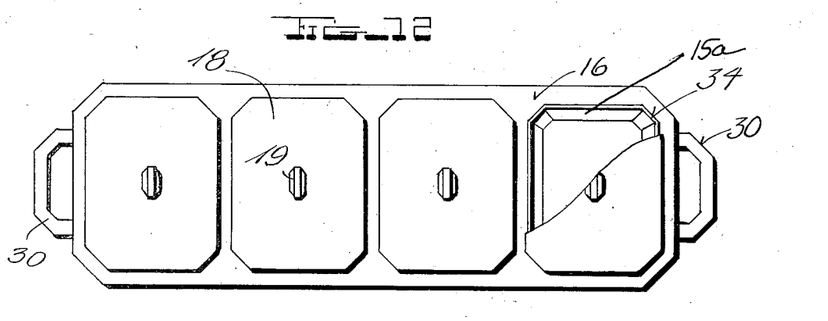
Fig. 12 is a top plan view with parts broken away of the form disclosed in Fig. 11.
Figures 13, 14:
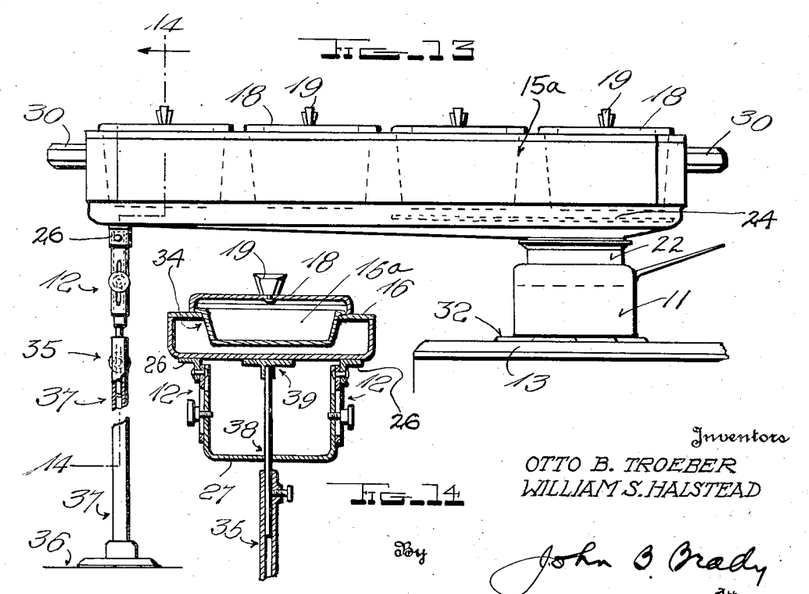
Fig. 13 is a front elevation showing a modified form of an extension leg so that the device may be held in a level position by an auxiliary leg resting on the floor adjacent to a range.
Fig. 14 is a transverse vertical section taken on line 14—14 of Fig. 13.
Figures 15, 16, 17:
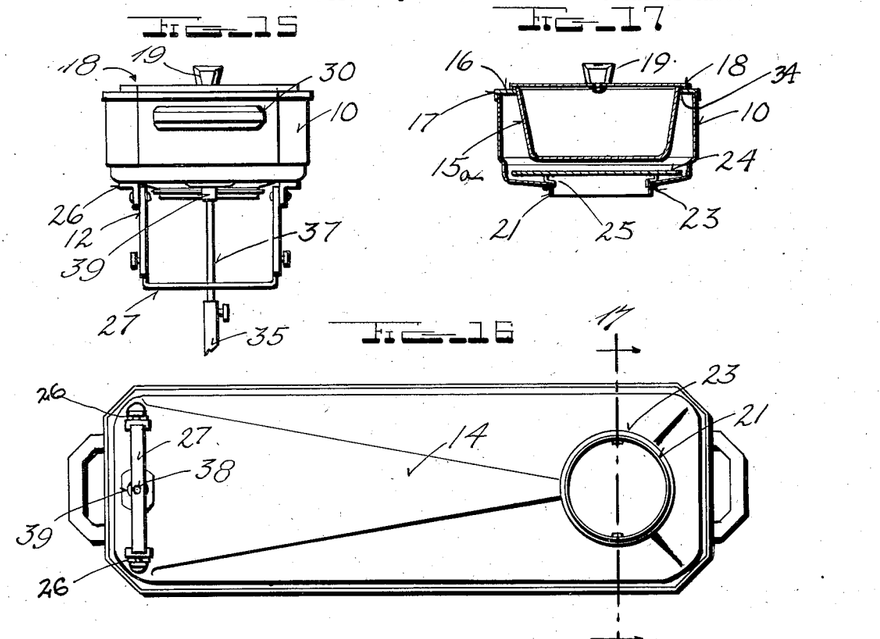
Fig. 15 is an end view of the device shown in Fig. 13 further illustrating the manner in which the auxiliary extension leg is attached.
Fig. 16 is a bottom plan view of the device shown in Figs. 12 and 13 with the folding leg extending vertically, as in the normal operating position.
Fig. 17 is a transverse vertical section taken on line 17—17 of Fig. 16.

In Figs. 11 to 17, a slight modification of the device is illustrated whereby the construction of the steam chest permits the use of removable food receptacles 15a inserted in openings 34, Figs. 12 and 14, provided in the top 16 of the chest. In this construction where removable food receptacles 15a are employed, the top 16 of the device may be permanently fastened to the body of the steam chest 10. It is understood that receptacles of the shape illustrated need not be employed, since round pots may be used, in which event round holes are provided in the top of the chest. The particular shape illustrated is believed to be most desirable, however, as the maximum amount of food warming space is thereby provided. In order to reduce the space occupied by the device when in operation on a range, especially when a steam tray of a large size is employed, an auxiliary floor leg 35 may be attached to the bottom of the steam chest, as illustrated in Fig. 13, showing the adaptation of the auxiliary leg to the device whereby it is supported horizontally by the auxiliary leg extending upwardly from the floor 36 to the bottom of the chest. The means of attaching the auxiliary floor leg to the steam chest is illustrated in detail in Figs. 14, 15, and 16. The upper or adjustable portion of the floor leg 37 is inserted into a hole 38, shown in Fig. 16, provided in the lower horizontal section 27 of the hinged leg 12, extended in the vertical position. The end of the upper portion of the floor leg is then rigidly held by a small flange or collar 39, shown in Figs. 14 to 16, inclusive, attached to the bottom of the steam chest. Movement of the floor leg from the selected supporting position is thus prevented and the steam chest is firmly supported in the required horizontal position. As a burner at the outer edge of the range may be employed, as shown at 32, Fig. 13, when this arrangement is used, a minimum amount of cooking space is occupied by the device.

Figure 18:
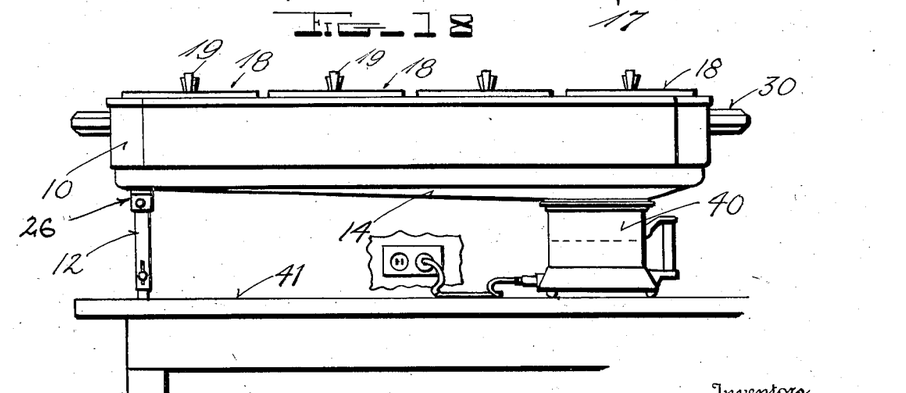
Fig. 18 is a front elevation of the device adapted to a small electric steam generating vessel disposed on a table.
Figure 19:
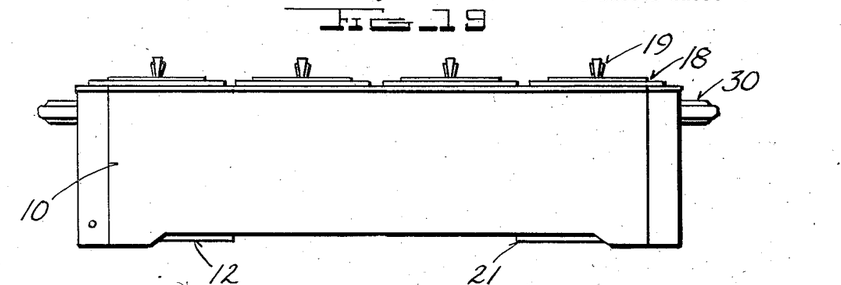
Fig. 19 is a front elevation of another modification of the device disclosing a construction wherein the sides are extended downwardly to form an enclosure around the lower portion of the steam chest thereby more fully adapting the device for use in both the heating and serving of food.
Figure 20:
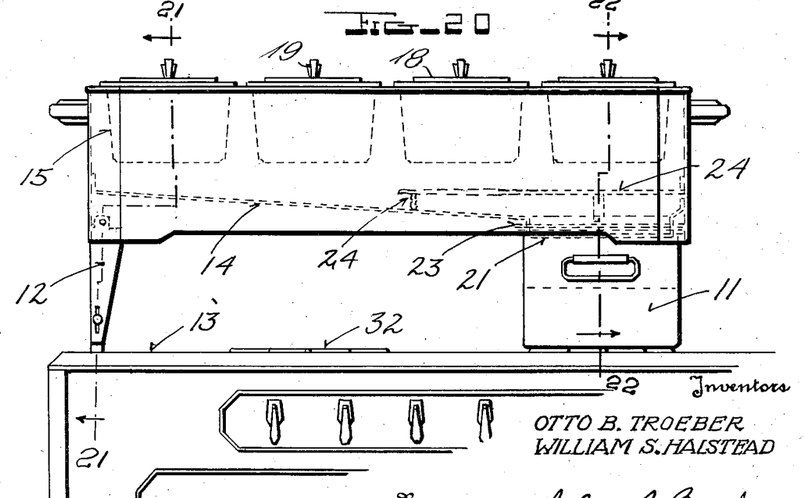
Fig. 20 is a front elevation of the device as disclosed in Fig. 19, showing the supporting legs extended and a steam generating vessel connected with the food warming compartment.
Figure 21:
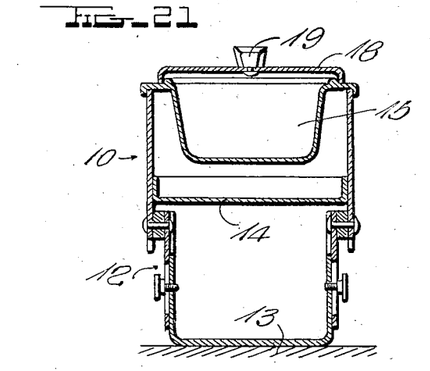
Fig. 21 is a transverse vertical section taken on line 21—21 of Fig. 20.
Figure 22:
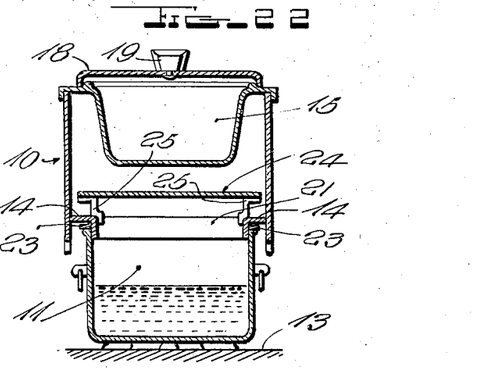
Fig. 22 is a transverse vertical section taken on line 22—22 of Fig. 20.

In order to adapt the device for use in small apartments, for example, where no range may be available, a small electric steam generating vessel 40, located on a table 41, Fig. 18, may be utilized to heat the steam chest and to slowly cook food or warm it by the process previously described. The electric steam generator 40 is attached to the steam chest in a manner similar to that already outlined in connection with the operation of the device on a range. A small quantity of water is placed in the vessel, as illustrated by dotted lines representing the water level within the heater, and the water is brought to the boiling point by the heating action of a resistance coil or immersed electrodes, not illustrated, installed in the bottom of the steam generator.

The device of Figs. 19 to 22, inclusive, is an additional modification of the form of the device previously described. The sides of the steam chest 10 are extended straight downwards from the top of the chest to a point below the plane of the lower edge of the steam inlet collar 21. A sloping bottom 14 is affixed to the sides of the chest in the position shown in Fig. 20. In this manner, the folding leg 12 and the collar 20 are almost entirely concealed when the device is not in operation on the steam generator. The extension of the sides, in the manner shown, also provides supporting feet for the device when it is in use as a serving tray.

Figure 23:
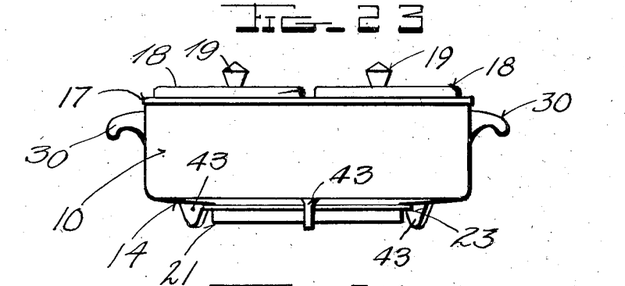
Fig. 23 is a front elevation of still another modified form of the device disclosing a centrally disposed steam inlet and collar.
Figure 24:
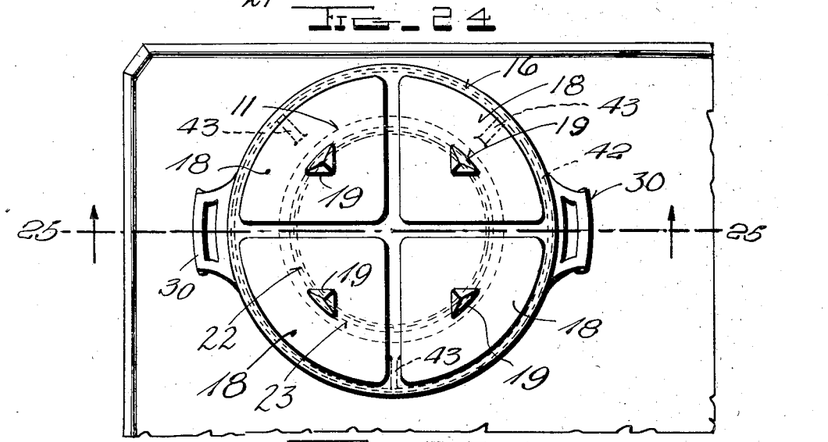
Fig. 24 is a top plan view of the device showing the same in position on a range.
Figure 25:
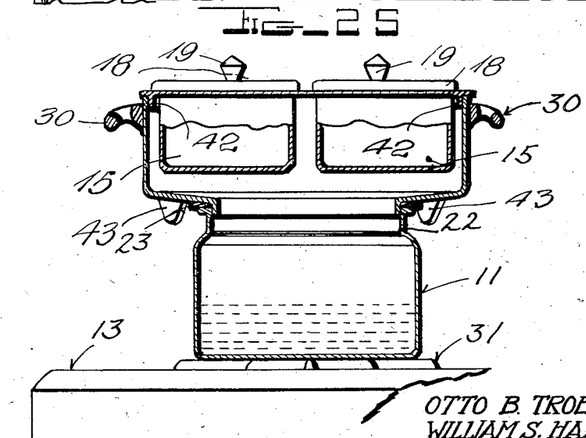
Fig. 25 is a central vertical longitudinal section taken on line 25—25 of Fig. 24.

Figs. 23 to 25, inclusive, illustrate a further modification of the device of our invention in which the hinged supporting leg and steam deflector have been eliminated. The steam inlet and condensate discharge member 21 for connection with pot 11 is disposed in a central position in the sloping bottom 14, with respect to the center of the horizontal surface of the top 16 of the device. The top 16 which is removable is preferably provided with four food receptacles 15 of triangular shape, as illustrated in Fig. 24, and with a downwardly extending flange 42, as shown in Fig. 25, located adjacent to the lower periphery of the top and tightly insertable within the upper edge of the body of the device 10 so as to form a steam tight closure when in position. The bottom 14 is preferably provided with three small supporting legs 43 equally spaced with respect to the periphery of bottom 14, thereby effecting rigid support of the device when it is placed on a table after removal from the steam generator. The steam chest of circular shape and the triangular food receptacles, as illustrated in Figs. 23 to 25, provide a maximum food holding space but designs of various shapes may be employed without departing from the spirit of our invention.

In the operation of the circular steam chest illustrated, advantage is taken of the balanced designed wherein the center of gravity of the device is directly over the center of the steam inlet collar 21 which, when inserted in the neck of the steam generating vessel 11, provides rigid support of the steam chest in the desired position without the use of other supporting means. Inasmuch as the rising steam from the steam generator is evenly distributed within the chest, no deflector is necessary.

It is to be understood that the invention is not limited to the particular constructions shown and described hereinabove, as numerous changes and modifications will readily suggest themselves and may be made without departing from the essential elements of the invention. All such changes and modifications as come within the appended claims are embraced thereby and we intend no limitations upon our invention except as may be imposed by the scope of the appended claims.

What we claim as new and desire to secure by Letters Patent of the United States is as follows:

1. A food warming device of the class described, comprising a steam generator, an enclosed tank whose top consists of a substantially flat horizontal surface provided with a plurality of downwardly extending recesses for holding separate quantities of food and whose bottom is inclined downwards to the top of said steam generator, and means for connecting the lowest portion of the bottom of said tank to the top of said steam generator to permit uninterrupted natural flow of condensate from the bottom of said tank into said steam generator.

2. A food warming device of the class described, comprising an enclosed tank whose top consists of a substantially flat horizontal surface provided with a plurality of downwardly extending recesses for holding separate quantities of food and whose bottom is inclined downwardly and apertured in the lowest portion thereof, and means for connecting the apertured portion of said downwardly inclined bottom to the top of a steam generating vessel to permit natural flow of condensate from the bottom of said tank to the interior of said steam generating vessel.

3. A portable food warming device, comprising an enclosed tank whose top consists of a substantially horizontal surface provided with a plurality of downwardly extending spaced recesses for holding separate quantities of food and whose bottom is inclined downwardly and provided with an opening disposed in the lowest part of said bottom, means for connecting the lowest part of said bottom containing said opening to an external steam generating vessel to permit natural flow of condensate from the bottom of said tank into said steam generating vessel, and means for supporting said tank to effect rigid horizontal disposition of said top while the device is in operation in connection with said external steam generating vessel.

4. A portable food warming device, comprising an enclosed tank whose top consists of a substantially horizontal surface provided with a plurality of downwardly extending spaced recesses for holding separate quantities of food and whose bottom is inclined downwardly and provided with a single aperture in said bottom, means for detachably connecting said bottom adjacent the apertured portion thereof to an external steam generating vessel to permit simultaneous transfer of steam and condensate between said vessel and said tank, means for supporting said tank to effect rigid horizontal disposition of its top surface when said tank is connected with said steam generating vessel, and handles on said tank for facilitating the removal and carrying of said tank to a desired location remote from said steam generating vessel.

5. A portable food warming device, comprising in combination an enclosed tank whose top consists of a substantially horizontal surface provided with a plurality of downwardly extending spaced recesses for holding separate quantities of food and whose bottom is inclined downwards to a single circular aperture disposed at the lowest portion of said bottom, a downwardly projecting collar extending from the lower periphery of said circular aperture, and means for limiting the downward insertion of said collar into a steam generating vessel directly disposed beneath said circular aperture.

6. A food warming device, comprising in combination an enclosed tank whose top consists of a substantially horizontal surface provided with a plurality of downwardly extending spaced recesses for holding separate quantities of food and whose bottom is inclined downwards to a single circular aperture disposed adjacent to one end of said bottom, a downwardly projecting collar extending from the periphery of said circular aperture, and a flange around the upper portion of the periphery of said downwardly projecting collar to limit the extent of the downward extension of the collar within the mouth of a steam generating vessel disposed directly beneath said circular aperture.

7. A food warming device, comprising in combination an enclosed tank whose top consists of a substantially horizontal surface provided with a plurality of downwardly extending spaced recesses for holding separate quantities of food and whose bottom is inclined downwards to a circular aperture disposed adjacent to one end of said bottom, a downwardly projecting collar extending from the lower periphery of said circular aperture, a ring around the upper portion of the periphery of said downwardly projecting collar, a steam deflecting surface supported above said circular aperture for directing steam towards the center of said tank, and a hinged extension leg disposed adjacent to the other end of said bottom to rigidly maintain said tank in a substantially horizontal position when in operation.

8. A food warming device of the class described, comprising in combination an enclosed tank whose top is provided with means for holding a plurality of removable food receptacles and whose bottom is inclined downwardly and provided with an aperture disposed at the lowest portion of said bottom, non-leakable means for detachably connecting the lowest portion of said bottom containing said aperture to a steam generating vessel, and means for supporting said tank in a substantially horizontal position, said tank being removable from said steam generating vessel to a position for serving from said receptacles.

9. A food warming device of the class described, comprising in combination an enclosed tank whose top is provided with a plurality of downwardly extending spaced recesses for holding separate quantities of food, said top being detachable from said tank, and whose bottom is inclined downwards to a circular aperture disposed at the lowest portion of said bottom, a projecting collar extending vertically downwards from the periphery of said circular aperture, and means for limiting the downward insertion of the collar into a steam generating vessel disposed directly beneath said aperture.

10. A steam cooker comprising a tank, a steam inlet and condensate discharge sleeve member extending from the bottom of one end of said tank, connecting means extending from the other end of said tank, a pair of link members pivotally connected with said connecting means, a U-shaped supporting member having side portions extending immediately adjacent said link members, means for adjustably connecting the side portions of said U-shaped supporting member with said link members, said U-shaped supporting member and said link members being foldable to a horizontal position directly beneath said tank for serving in coaction with said sleeve member as a support for said tank and being shiftable to a position normal to the bottom of said tank for supporting the said tank in coaction with said sleeve member when connected with the steam generator.

11. A steaming device for food comprising a tray carrying a depending steam inlet and condensate discharge member on one end of the bottom thereof, foldable supporting means on the opposite end of the bottom thereof, said steam inlet and condensate discharge member being connectible with a steam generator, food receptacles carried by the top of said tray, said foldable supporting means being pivotally connected to the bottom of said tray and movable from a position in a plane immediately adjacent the bottom of said tray to a position normal thereto for supporting said tray in a horizontal position when said tray is in a coactive position on said steam generator.

12. A steaming device for food comprising a tray carrying a depending steam inlet and condensate discharge sleeve on one end of the bottom thereof, adjustable supporting means on the opposite end of the bottom thereof, said steam inlet and condensate discharge sleeve being connectible with a steam generator, food receptacles carried by said tray, said adjustable supporting means comprising a pair of link members pivotally connected to the bottom of said tray, each of said link members having longitudinal slots therein, a U-shaped member having the side portions thereof disposed immediately adjacent said pivotally connected links, adjustable locking means carried by said U-shaped member and extending through the slots in said link members for adjusting and fixing the effective height of said U-shaped member for supporting said tray in a substantially horizontal position with respect to the top edge of said steam generator connected with said steam inlet and discharge connection at the opposite end of said tray.

13. In a steaming device, a horizontally disposed tray, a plurality of food containers inserted in the top of said tray in a position for the free circulation of steam around the sides and bottoms of said food containers, a steam inlet and condensate discharge member in the bottom of one end of said tray, a steam generator connected with said member, and a deflector plate extending in a substantially horizontal plane above said member and over an area above the bottom of said tray equivalent to the area covered in said tray by at least two of said food containers for effecting a uniform distribution of steam around all of said food containers.

14. In a steaming device, a horizontally disposed tray, a plurality of food containers supported within said tray in a position for the free circulation of steam therearound, a steam inlet and condensate discharge member in the bottom of one end of said tray, a steam generator connected with said member, and a deflector plate removably mounted in said tray in a position extending horizontally above said member and projecting in a substantially horizontal plane above the bottom of said tray for a distance equal to the width of at least two or said food containers for effecting a uniform distribution of steam around all of said food containers.

15. In a steaming device, a horizontally disposed tray, a plurality of food containers supported with respect to said tray in a position for the free circulation of steam therearound, a steam inlet and condensate discharge member in the bottom of one end of said tray, a steam generator connected with said member, a substantially horizontal baffle plate removably mounted in said tray in a position spaced above said member and extending for a distance substantially equal to the width of at least two of said food containers for effecting a substantially uniform distribution of steam around all of said food containers.

16. A steaming appliance for utilization on a cook stove comprising a substantially horizontally extending tray, food receptacles in said tray, a steam inlet and condensate discharge member in the bottom of one end of said tray and projecting beneath said tray for establishing connection with a steam generator, said tray being adapted to project beyond one side of the cook stove, and a slidably adjustable pedestal member connectible with said tray adjacent to the opposite end thereof and supported from a position adjacent to the base of the cook stove for maintaining said tray in a substantially horizontal position projecting beyond the side of the cook stove.

17. A steaming appliance for utilization on a cook stove comprising a substantially horizontally extending tank, food receptacles downwardly suspended in said tank, a steam inlet and condensate discharge member in the bottom of one end of said tank and projecting beneath said tank for establishing connection with a steam generator, said tank being adapted to project beyond one side of the cook stove, and a pedestal member comprising a multiplicity of sections telescopically adjustable in height connectible with said tray adjacent to the oposite end thereof and supported from a position adjacent to the base of the cook stove for maintaining said tank in a substantially horizontal position projecting beyond the side of the cook stove.

18. In a food cooking device in combination, an external steam generator, and a casing having a downwardly depending member detachably engaging said steam generator and providing a passage for live steam into said casing, a multiplicity of food containers suspended in said casing, and individual cover members for each of said food containers, said casing being removable from said steam generator to a position for serving from said food containers.

19. In a food cooking device, in combination with a steam generator, a removable cover device for said steam generator, said cover device having a downwardly depending flange for establishing a demountable steam tight joint with respect to said steam generator, a plurality of food containers suspended in said cover device, a lid individual to each of said food containers, said device being removable from said steam generator, and feet on the bottom of said device for supporting said device independent of said steam generator.

OTTO B. TROEBER.
WILLIAM S. HALSTEAD.